US010822705B2

(12) United States Patent
Cho et al.

(10) Patent No.: US 10,822,705 B2
(45) Date of Patent: Nov. 3, 2020

(54) SURFACE-TREATMENT SOLUTION COMPOSITION CONTAINING TRIVALENT CHROMIUM AND INORGANIC COMPOUND, ZINC-BASED PLATED STEEL SHEET SURFACE-TREATED USING SAME, AND METHOD FOR PRODUCING SAME

(71) Applicant: POSCO, Pohang-si (KR)

(72) Inventors: Soo-Hyoun Cho, Pohang-si (KR); Won-Ho Son, Pohang-si (KR); Chang-Hoon Choi, Pohang-si (KR)

(73) Assignee: POSCO, Pohang-si (KR)

( * ) Notice: Subject to any disclaimer, the term of this patent is extended or adjusted under 35 U.S.C. 154(b) by 54 days.

(21) Appl. No.: 16/339,888

(22) PCT Filed: Sep. 29, 2017

(86) PCT No.: PCT/KR2017/010918
§ 371 (c)(1),
(2) Date: Apr. 5, 2019

(87) PCT Pub. No.: WO2018/070720
PCT Pub. Date: Apr. 19, 2018

(65) Prior Publication Data
US 2019/0264334 A1    Aug. 29, 2019

(30) Foreign Application Priority Data

Oct. 10, 2016  (KR) .................. 10-2016-0130893

(51) Int. Cl.
| | |
|---|---|
| B32B 15/08 | (2006.01) |
| C23C 22/42 | (2006.01) |
| C23C 22/82 | (2006.01) |
| C09D 5/08 | (2006.01) |
| C23C 2/40 | (2006.01) |
| C23C 22/40 | (2006.01) |
| C09D 4/00 | (2006.01) |
| C23C 2/06 | (2006.01) |
| C23C 2/26 | (2006.01) |
| C23C 22/05 | (2006.01) |
| C23C 22/53 | (2006.01) |

(52) U.S. Cl.
CPC ............. *C23C 22/42* (2013.01); *C09D 4/00* (2013.01); *C09D 5/08* (2013.01); *C23C 2/06* (2013.01); *C23C 2/26* (2013.01); *C23C 2/40* (2013.01); *C23C 22/05* (2013.01); *C23C 22/40* (2013.01); *C23C 22/53* (2013.01); *C23C 22/82* (2013.01); *Y10T 428/12556* (2015.01); *Y10T 428/12569* (2015.01); *Y10T 428/12792* (2015.01); *Y10T 428/12799* (2015.01)

(58) Field of Classification Search
None
See application file for complete search history.

(56) References Cited

U.S. PATENT DOCUMENTS

| | | | |
|---|---|---|---|
| 6,387,538 B1 | 5/2002 | Lee et al. | |
| 2006/0054248 A1 | 3/2006 | Straus | |
| 2006/0099439 A1 | 5/2006 | Kochilla et al. | |
| 2007/0023104 A1* | 2/2007 | Yamamoto | C23C 22/17 148/266 |
| 2007/0243397 A1* | 10/2007 | Ludwig | C23C 22/34 428/472.1 |
| 2008/0127859 A1 | 6/2008 | Kolberg et al. | |
| 2013/0177768 A1 | 7/2013 | Kruger et al. | |

FOREIGN PATENT DOCUMENTS

| | | |
|---|---|---|
| CN | 1277640 | 12/2000 |
| CN | 1340635 | 3/2002 |
| CN | 101098984 | 11/2011 |
| CN | 102257178 | 11/2011 |
| CN | 102337532 | 2/2012 |
| CN | 103459666 | 12/2013 |
| EP | 1484432 | 12/2004 |
| EP | 2695970 | 2/2014 |
| JP | 06173027 | 6/1994 |
| JP | 2000017451 | 1/2000 |
| JP | 2002069660 | 3/2002 |
| JP | 2009149926 | 7/2009 |

(Continued)

OTHER PUBLICATIONS

European Search Report—European Application No. 17860711.5, dated Jun. 28, 2019, citing US 2013/177768, EP 1 484 432 and US 2006/099439.

(Continued)

*Primary Examiner* — Seth Dumbris
(74) *Attorney, Agent, or Firm* — Cantor Colburn LLP

(57) ABSTRACT

Provided is a surface-treating solution composition, a zinc-based plated steel sheet surface-treated using the same, and a method for producing the same, wherein the surface-treatment solution composition includes: 10 wt % to 20 wt % of a trivalent chromium compound containing chromium phosphate (A) and chromium nitrate (B), the content ratio thereof, A/(A+B), satisfying 0.3 to 0.6; 20 wt % to 40 wt % of a silane-based sol-gel resin in which three types of silane compounds are crosslinked; 0.2 wt % to 0.4 wt % of a rust-inhibiting and corrosion-resistant agent; 0.1 wt % to 0.3 wt % of a molybdenum-based compound; 5 wt % to 10 wt % of a water-soluble cationic urethane resin; 0.5 wt % to 2.0 wt % of a silane coupling agent; 0.5 wt % to 2.0 wt % of an Al compound; and 25.3 wt % to 63.7 wt % of water. The zinc-based plated steel sheet surface-treated with the surface-treatment solution composition containing trivalent chromium has an excellent effect on corrosion resistance, blackening resistance, fingerprint resistance, piping oil infiltration, and alkali resistance.

20 Claims, No Drawings

(56) References Cited

FOREIGN PATENT DOCUMENTS

| | | |
|---|---|---|
| KR | 20000035781 | 6/2000 |
| KR | 20010057231 | 7/2001 |
| KR | 20040046347 | 6/2004 |
| KR | 20050052215 | 6/2005 |
| KR | 100535769 | 12/2005 |
| KR | 20060123628 | 12/2006 |
| KR | 20090024450 | 3/2009 |
| KR | 20100106031 | 10/2010 |
| KR | 20130124380 | 11/2013 |
| KR | 101786358 | 10/2017 |

OTHER PUBLICATIONS

International Search Report—PCT/KR2017/010918 dated Jan. 30, 2018.
Chinese Office Action—Chinese Application No. 201780062656.8 dated Jun. 23, 2020, citing CN 1277640, CN 103459666, CN 1340635, CN 102257178, CN 102337532, US 2006/0054248, CN 101098984, and JP 2000-017451.

\* cited by examiner

SURFACE-TREATMENT SOLUTION COMPOSITION CONTAINING TRIVALENT CHROMIUM AND INORGANIC COMPOUND, ZINC-BASED PLATED STEEL SHEET SURFACE-TREATED USING SAME, AND METHOD FOR PRODUCING SAME

TECHNICAL FIELD

The present disclosure relates to a surface-treatment solution composition containing trivalent chromium and an inorganic compound, a zinc-based plated steel sheet surface-treated using the same, and a method for producing the same.

BACKGROUND ART

A molten galvanizing material, comprising a zinc (Zn) plated layer, is widely used as a material for building materials due to having excellent corrosion resistance due to the protective effect of the ferrous iron by the sacrificial method. However, the molten galvanizing material may mainly be made of Zn on a surface to be exposed. Therefore, when exposed to a normal environment, especially a wet atmosphere, white rust may occur on the surface to easily deteriorate an appearance of the surface. In addition, when the molten galvanizing material is exposed to a high-temperature and high-humidity environment, there is a problem in which a surface color thereof may be changed to black, i.e., a blackening phenomenon may easily occur.

To solve such problems, conventionally, corrosion resistance and blackening resistance have been secured by applying hexavalent chromium or a chromate treatment to a plated steel sheet. However, since hexavalent chromium has been designated as an environmentally hazardous substance, regulations for the use of hexavalent chromium are now being strengthened. Furthermore, when using hexavalent chromium as a surface treating agent for a plated steel sheet, there may be a problem in which a surface of the steel sheet is blackened, or black spots may be generated thereon.

Therefore, at present, a method of coating a surface-treatment solution composition containing trivalent chromium on a steel sheet, to secure corrosion resistance and blackening resistance of a plated steel sheet, has been applied. For example, in patent publications Korean Patent Publication Nos. 10-2006-0123628, 10-2005-0052215, and 10-2009-0024450, corrosion resistance and blackening resistance properties are secured by a method in which a steel sheet may be immersed in a composition containing trivalent chromium to perform a chemical conversion treatment. However, there may be a problem in which it takes a relatively long time to immerse the steel in the continuous process of the steelmaker, and the chemical conversion treatment may have deteriorated fingerprint resistance, or the like.

In Korean Patent Publication No. 10-2004-0046347 and Japanese Patent Publication No. 2002-069660, a composition containing trivalent chromium may be coated on a steel sheet by a spray or roll coating method. Therefore, such methods may be applied in the continuous process of the steelmaker, and may have fingerprint resistance. However, since the composition contains a porous silica component, it may be not suitable for Mg and Al alloys, which may be highly discolored in a relatively wet atmosphere. Further, since the porous silica has high hygroscopic properties, a problem in which discoloration may rapidly occur in Mg, Al, and Zn alloy steel sheets, may occur.

DISCLOSURE

Technical Problem

An aspect of the present disclosure may provide a surface-treatment solution composition, which may not contain hexavalent chromium, an environmentally hazardous substance, and which may contain trivalent chromium and an inorganic compound as main components, harmless to the human body, and may provide a surface-treated zinc-based plated steel sheet, having an excellent effect on corrosion resistance, blackening resistance, fingerprint resistance, piping oil infiltration, and alkali resistance, by applying the solution composition to a surface of a zinc-based plated steel sheet.

Technical Solution

According to an aspect of the present disclosure, a surface-treatment solution composition for a zinc-based plated steel sheet, includes: 10 wt % to 20 wt % of a trivalent chromium compound containing chromium phosphate (A) and chromium nitrate (B); 20 wt % to 40 wt % of a silane-based sol-gel resin in which three types of silane compounds are crosslinked; 0.2 wt % to 0.4 wt % of a rust-inhibiting and corrosion-resistant agent; 0.1 wt % to 0.3 wt % of a molybdenum-based compound; 5 wt % to 10 wt % of a water-soluble cationic urethane resin; 0.5 wt % to 2.0 wt % of a silane coupling agent; 0.5 wt % to 2.0 wt % of an Al compound; and 25.3 wt % to 63.7 wt % of water.

In the surface-treating solution composition, the chromium phosphate (A) and the chromium nitrate (B) may satisfy a content ratio A/(A+B) of 0.3 to 0.6.

In the surface-treating solution composition, the rust-inhibiting and corrosion-resistant agent may be one or more selected from the group consisting of a fluorine-based rust inhibitor, a vanadium-based rust inhibitor, a cerium salt-based rust inhibitor, and a cobalt-based rust inhibitor.

In the surface-treating solution composition, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the surface-treating solution composition, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

In the surface-treating solution composition, the Al compound may be one or more selected from the group consisting of aluminum hydroxide, aluminum chloride, aluminum nitride, aluminum sulfate, aluminum isopropoxide, and aluminum phosphate.

In the surface-treating solution composition, the three types of silane compounds may be one type of first silane selected from the group consisting of tetraethylorthosilicate, tetramethoxysilane, methyltrimethoxysilane, methyltriethoxysilane, dimethyldimethoxysilane, and dimethyldiethoxysilane; one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

According to an aspect of the present disclosure, a surface-treated zinc-based plated steel sheet includes: a steel sheet; a zinc-based plated layer formed on at least one surface of the steel sheet; and a trivalent chromate film layer formed on the zinc-based plated layer, wherein the trivalent chromate film layer includes: 31.47 wt % to 35.23 wt % of a trivalent chromium compound containing chromium phosphate (A) and chromium nitrate (B); 32.49 wt % to 36.36 wt % of a silane-based sol-gel resin in which three types of silane compounds are crosslinked; 2.03 wt % to 2.27 wt % of a rust-inhibiting and corrosion-resistant agent; 1.14 wt % to 1.52 wt % of a molybdenum-based compound; 12.18 wt % to 13.64 wt % of a urethane resin; 5.68 wt % to 10.15 wt % of a silane coupling agent; and 5.68 wt % to 10.15 wt % of an Al compound.

In the surface-treated zinc-based plated steel sheet, the chromium phosphate (A) and chromium nitrate (B) may satisfy a content ratio A/(A+B) of 0.89 to 0.95.

In the surface-treated zinc-based plated steel sheet, the rust-inhibiting and corrosion-resistant agent may be one or more selected from the group consisting of a fluorine-based rust inhibitor, a vanadium-based rust inhibitor, a cerium salt-based rust inhibitor, and a cobalt-based rust inhibitor.

In the surface-treated zinc-based plated steel sheet, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the surface-treated zinc-based plated steel sheet, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

In the surface-treated zinc-based plated steel sheet, the Al compound may be one or more selected from the group consisting of aluminum hydroxide, aluminum chloride, aluminum nitride, aluminum sulfate, aluminum isopropoxide, and aluminum phosphate.

In the surface-treated zinc-based plated steel sheet, the three types of silane compounds may be one type of first silane selected from the group consisting of tetraethylorthosilicate, tetramethoxysilane, methyltrimethoxysilane, methyltriethoxysilane, dimethyldimethoxysilane, and dimethyldiethoxysilane; one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

In the surface-treated zinc-based plated steel sheet, the trivalent chromate film layer may have a thickness of 0.3 µm to 0.5 µm.

According to an aspect of the present disclosure, a method for producing a surface-treated zinc-based plated steel sheet, includes: coating a surface-treatment solution composition on a zinc-based plated steel sheet on which a zinc-based plated layer is formed; and drying the coated surface-treatment solution composition to form a trivalent chromate film layer, wherein the surface-treatment solution composition includes: 10 wt % to 20 wt % of a trivalent chromium compound containing chromium phosphate (A) and chromium nitrate (B); 20 wt % to 40 wt % of a silane-based sol-gel resin in which three types of silane compounds are crosslinked; 0.2 wt % to 0.4 wt % of a rust-inhibiting and corrosion-resistant agent; 0.1 wt % to 0.3 wt % of a molybdenum-based compound; 5 wt % to 10 wt % of a water-soluble cationic urethane resin; 0.5 wt % to 2.0 wt % of a silane coupling agent; 0.5 wt % to 2.0 wt % of an Al compound; and 25.3 wt % to 63.7 wt % of water.

In the method, the chromium phosphate (A) and the chromium nitrate (B) may satisfy a content ratio A/(A+B) of 0.3 to 0.6.

In the method, the rust-inhibiting and corrosion-resistant agent may be one or more selected from the group consisting of a fluorine-based rust inhibitor, a vanadium-based rust inhibitor, a cerium salt-based rust inhibitor, and a cobalt-based rust inhibitor.

In the method, the molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

In the method, the silane coupling agent may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

In the method, the Al compound may be one or more selected from the group consisting of aluminum hydroxide, aluminum chloride, aluminum nitride, aluminum sulfate, aluminum isopropoxide, and aluminum phosphate.

In the method, the three types of silane compounds may be one type of first silane selected from the group consisting of tetraethylorthosilicate, tetramethoxysilane, methyltrimethoxysilane, methyltriethoxysilane, dimethyldimethoxysilane, and dimethyldiethoxysilane; one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

In the method, the surface-treatment solution composition may be coated to a thickness of 2.14 µm to 3.57 µm.

In the method, the coating may be performed by any one method selected from the group consisting of roll coating, spraying, immersion, spray squeezing, and immersion squeezing.

In the method, the drying may be performed at a temperature of 50° C. to 60° C. on the basis of a Peak Metal Temperature (PMT) of a steel sheet.

In the method, the drying may be performed in a hot-air drying furnace or an induction heating furnace.

In the method, the hot-air drying furnace may have an internal temperature of 100° C. to 200° C.

In the method, the induction heating furnace may be applied with an electric current of 1,000 A to 3,500 A.

In the method, air-cooling the trivalent chromate film layer may be further included.

In the method, the manufacturing method may be a continuous process, wherein the continuous process may have a speed of 80 mpm to 100 mpm.

Advantageous Effects

According to an aspect of the present disclosure, the zinc-based plated steel sheet surface-treated with the surface-treatment solution composition containing trivalent chromium and an inorganic compound may have an excellent effect on corrosion resistance, blackening resistance, fingerprint resistance, piping oil infiltration, and alkali resistance.

BEST MODE FOR INVENTION

Hereinafter, preferred embodiments of the present disclosure will be described with reference to various embodiments. However, embodiments of the present disclosure may be modified into various other embodiments, and the scope of the present disclosure is not limited to embodiments described below.

The present disclosure relates to a surface-treatment solution composition containing trivalent chromium and an inorganic compound, a zinc-based plated steel sheet surface-treated using the same, and a method for producing the zinc-based plated steel sheet.

A surface-treatment solution composition according to an embodiment of the present disclosure may include 10 wt % to 20 wt % of a trivalent chromium compound; 20 wt % to 40 wt % of a silane-based sol-gel resin; 0.2 wt % to 0.4 wt % of a rust-inhibiting and corrosion-resistant agent; 0.1 wt % to 0.3 wt % of a molybdenum-based compound; 5 wt % to 10 wt % of a water-soluble cationic urethane resin; 0.5 wt % to 2.0 wt % of a silane coupling agent; 0.5 wt % to 2.0 wt % of an Al compound; and 25.3 wt % to 63.7 wt % of water, and the trivalent chromium compound may satisfy a content ratio A/(A+B) of 0.3 to 0.6.

A zinc-based plated steel sheet surface-treated with the surface-treatment solution composition containing trivalent chromium according to an embodiment of the present disclosure may have an excellent effect on corrosion resistance, blackening resistance, fingerprint resistance, piping oil infiltration, and alkali resistance. In addition, damage to the human body and environmental pollution may be prevented, by containing trivalent chromium as a main component, harmless to the human body, without an inclusion of hexavalent chromium, an environmentally hazardous substance.

The trivalent chromium compound may be a component contained in the surface-treatment solution composition of the present disclosure as a main component, may have a self-healing effect and self-lubricating properties similar to hexavalent chromium, and may function to secure corrosion resistance and blackening resistance. The trivalent chromium compound contained in the composition of the present disclosure may include chromium phosphate (A) and chromium nitrate (B).

As the ratio of chromium phosphate increases, corrosion resistance may be improved, while blackening resistance may be deteriorated. As the chromium nitrate ratio increases, blackening resistance may be improved, while corrosion resistance may be deteriorated. For example, when the film is formed with the chromium phosphate, a phosphoric acid component may not be volatilized. Therefore, a chromium phosphate film may be formed on a surface of the film, and corrosion resistance may be improved. Blackening resistance of the chromium phosphate may be deteriorated due to a hygroscopic property of the chromium phosphate. When the film is formed with the chromium nitrate, a nitric acid component may be mostly volatilized and may not affect blackening resistance. As the content of chromium nitrate increases, the film of chromium phosphate may barely be formed on a surface of the film, and corrosion resistance may be deteriorated.

Therefore, according to one embodiment of the present disclosure, the content ratio A/(A+B) of the chromium phosphate (A) and the chromium nitrate (B) may satisfy 0.3 to 0.6. When the content ratio is less than 0.3, corrosion resistance may be deteriorated after processing. When the content ratio exceeds 0.6, blackening resistance may be deteriorated.

The total content of the trivalent chromium compound containing chromium phosphate (A) and chromium nitrate (B) is preferably 15 wt % to 30 wt %. When the content of the trivalent chromium compound is less than 10 wt %, a firm and insoluble film layer may become thinner. Therefore, since it may be difficult to effectively block penetration of moisture through a surface of the plated steel sheet requiring corrosion resistance, blackening may be caused and corrosion resistance may also be deteriorated. When the content of the trivalent chromium compound exceeds 20 wt %, the content of the silane-based sol-gel resin to be added for improving corrosion resistance, the content of the rust-inhibiting and corrosion-resistant agent, the content of the water-soluble cationic urethane resin serving as a binder, the content of the silane coupling agent, and the content of the Al compound may be relatively decreased. Therefore, there may be a problem in which it is difficult to secure sufficient corrosion resistance and blackening resistance.

The surface-treatment solution composition of the present disclosure may include a silane-based sol-gel resin for improving the corrosion resistance of the surface-treated zinc-based plated steel sheet. The silane-based sol-gel resin may be synthesized by using three types of silane compounds. In this case, two types of silane compounds may be crosslinked by one silane compound. In the case of using the silane-based sol-gel resin synthesized in advance, as in the present disclosure, the content of water may be reduced as compared with a cross-linking reaction during a heat treatment for forming the film.

The three types of silane compounds used in the synthesis of the sol-gel resin of the present disclosure may use one type of first silane selected from the group consisting of tetraethylorthosilicate, tetramethoxysilane, methyltrimethoxysilane, methyltriethoxysilane, dimethyldimethoxysilane, and dimethyldiethoxysilane; one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

The silane-based sol-gel resin may be prepared by dropping the three types of mixed silanes in a mixed solution containing ethanol, water, and formic acid. More specifically, the mixed solution may contain ethanol and water at a weight ratio of 10-30:40-60. When a relative small amount of ethanol beyond the above range is included, stability of the silane-based sol-gel resin may be lowered to deteriorate solution stability thereof. When an amount of ethanol exceeding beyond the above range is included, there is a problem in that roll workability may be deteriorated due to excessive volatilization of ethanol during formation of the final coating.

Formic acid may be mixed with 60 wt % to 80 wt % of water and ethanol in an amount of 1 wt % to 1.5 wt %. When the content thereof is less than 1 wt %, hydrolysis does not proceed sufficiently, and the silane may be not stably dispersed. When the content thereof exceeds 1.5 wt %, there is a problem that the formic acid in the dry film may remain to deteriorate physical properties of the product.

To the mixed solution containing water, ethanol, and formic acid as described above, the above-mentioned three types of silane compounds may be added to prepare a silane-based sol-gel resin. At this time, the three types of silanes may include the first, second, and third silanes in amounts of 10 wt % to 12 wt %, 10 wt % to 12 wt %, and 5 wt % to 7 wt %, respectively. When the content ratio of the first silane is lower than the above range, it may not provide a sufficient crosslinking ability and thus there may be a problem in forming a final film. When the content ratio of the first silane exceeds the above range, the solution stability may be deteriorated due to excessive crosslinking. When the content ratios of the second silane and the third silane are outside of the above range, and the content of either one is in a relative small or large amount, the solution stability may be deteriorated due to presence of unreacted functional group.

In preparing the silane-based sol-gel resin, it is preferable to add the three types of silane compounds to the mixed solution of water, ethanol, and formic acid over a period of about 1 hour to 3 hours. At this time, it is preferable to cool the reactor such that the temperature inside the reactor may be maintained at 30° C. or less. After completion of the addition, the sol-gel resin may be prepared by stirring at room temperature for about 24 hours to 36 hours.

The content of the silane-based sol-gel resin is preferably 20 wt % to 40 wt %. When the content of the silane-based sol-gel resin is less than 20 wt %, the corrosion factor may be not effectively blocked, and the corrosion resistance and blackening resistance may be deteriorated. When the content thereof exceeds 40 wt %, the content of the silane-based sol-gel resin to be added for improving corrosion resistance, the content of the rust-inhibiting and corrosion-resistant agent, the content of the water-soluble cationic urethane resin serving as a binder, the content of the silane coupling agent, and the content of the Al compound may be relatively decreased. Therefore, there may be a problem in which corrosion resistance may be deteriorated.

The rust-inhibiting and corrosion-resistant agent may be included for improving corrosion resistance of the zinc-based plated steel sheet surface-treated with the surface-treatment solution composition of the present disclosure. Preferably, the rust-inhibiting and corrosion-resistant agent may be one or more selected from the group consisting of a fluorine-based rust inhibitor, a vanadium-based rust inhibitor, a cerium salt-based rust inhibitor, and a cobalt-based rust inhibitor.

The content of the rust-inhibiting and corrosion-resistant agent is preferably 0.2 wt % to 0.4 wt %. When the content of the rust-inhibiting and corrosion-resistant agent is less than 0.2 wt %, there may be a problem in which it is difficult to secure corrosion resistance. When the content of the rust-inhibiting and corrosion-resistant agent exceeds 0.4 wt %, there may be a problem in which it is difficult to secure blackening resistance and alkali resistance.

The molybdenum-based compound may be added to improve blackening resistance of the zinc-based plated steel sheet surface-treated with the surface-treatment solution composition according to the present disclosure. The molybdenum-based compound may be one or more selected from the group consisting of molybdenum oxide, molybdenum sulfide, molybdenum acetate, molybdenum phosphate, molybdenum carbide, molybdenum chloride, molybdenum fluoride, and molybdenum nitride.

The content of the molybdenum-based compound is preferably 0.1 wt % to 0.3 wt %. When the content of the molybdenum-based compound is less than 0.1 wt %, there may be a problem in which it is difficult to secure blackening resistance. When the content of the molybdenum-based compound exceeds 0.3 wt %, an effect of improving blackening resistance may be insignificant, and corrosion resistance may be greatly deteriorated.

The water-soluble cationic urethane resin may be added for formation of a firm film layer of the zinc-based plated steel sheet surface-treated with the surface-treatment solution composition of the present disclosure. The water-soluble cationic urethane resin may improve a film-forming action which may be insufficient only by inorganic components, to form a firm film layer. Therefore, alkali resistance, piping oil infiltration, and fingerprint resistance may be improved.

The content of the water-soluble cationic urethane resin is preferably 5 wt % to 10 wt %. When the content of the water-soluble cationic urethane resin is less than 5 wt %, the film-forming action may be deteriorated and may not form a firm film layer. Therefore, it may be difficult to secure alkali resistance, piping oil infiltration, and fingerprint resistance. When the content of the water-soluble cationic urethane resin exceeds 10 wt %, the contents of the trivalent chromium compound and the sol-gel resin are relatively reduced. Therefore, corrosion resistance and blackening resistance properties may be reduced, which is not preferable.

The silane coupling agent may be added to crosslink the inorganic component and the organic component, to promote drying, and to ensure high corrosion resistance. The type of the silane coupling agent is not particularly limited, and, for examples, may be one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

The content of the silane coupling agent is preferably 0.5 wt % to 2.0 wt %. When the content of the silane coupling agent is less than 0.5 wt %, alkali resistance and piping oil infiltration may be deteriorated. When the content of the silane coupling agent exceeds 2.0 wt %, the film may become too dry to form an excessively hard film. Therefore, processed part corrosion resistance may be reduced, and piping oil infiltration may be deteriorated.

The Al compound may be added to improve the blackening resistance of the zinc-based plated steel sheet surface-treated with the surface-treatment solution composition of the present disclosure. The Al compound may be one or more selected from the group consisting of aluminum hydroxide, aluminum chloride, aluminum nitride, aluminum sulfate, aluminum isopropoxide, and aluminum phosphate.

The content of the Al compound is preferably 0.5 wt % to 2 wt %. When the content of the Al compound is less than 0.5 wt %, it may be difficult to secure blackening resistance. When the content thereof exceeds 2 wt %, the effect of improving blackening resistance may be insignificant, and the corrosion resistance may be greatly deteriorated.

The water may be a solvent for the surface-treatment solution composition of the present disclosure. The water may be used for diluting resins. The water refers to deionized water or distilled water. The solvent may be contained as a remainder in addition to the respective components of the present disclosure, and the content thereof is preferably 25.3 wt % to 63.7 wt %.

According to another embodiment of the present disclosure, a zinc-based plated steel sheet surface-treated with the surface-treatment solution composition containing the trivalent chromium and the inorganic compound, as described above, and a method of manufacturing the same may be provided.

The surface-treated zinc-based plated steel sheet may include a steel sheet, a zinc-based plated layer formed on at least one surface of the steel sheet, and a trivalent chromate film layer formed on the zinc-based plated layer. The trivalent chromate film layer may include 31.47 wt % to 35.23 wt % of a trivalent chromium compound; 32.49 wt % to 36.36 wt % of a silane-based sol-gel resin; 2.03 wt % to 2.27 wt % of a rust-inhibiting and corrosion-resistant agent; 1.14 wt % to 1.52 wt % of a molybdenum-based compound; 12.18 wt % to 13.64 wt % of a urethane resin; 5.68 wt % to 10.15 wt % of a silane coupling agent; and 5.68 wt % to 10.15 wt % of an Al compound. Further, the trivalent chromium compound may contain chromium phosphate (A) and chromium nitrate (B), and the content ratio A/(A+B) thereof may satisfy 0.89 to 0.95.

The trivalent chromate film layer may be a coating layer on which the above-described surface-treatment solution composition is dried, and may correspond to components remaining after volatile substances contained in the trivalent chromate film layer are all volatilized. As a result, the trivalent chromate film layer may not contain water as a solvent, and may not include water contained in the trivalent chromate compound, the silane-based sol-gel resin and the urethane resin. Therefore, the components contained in the trivalent chromate film layer may correspond to amounts based on 100 wt % of the total solids content.

The trivalent chromium compound may contain chromium phosphate (A) and chromium nitrate (B), the content ratio A/(A+B) thereof may satisfy 0.89 to 0.95, and the content thereof may be 31.47 wt % to 35.23 wt % based on the solids content. When the content of the trivalent chromium compound is less than 31.47 wt %, a firm and insoluble film layer may become thinner. Therefore, since it may be difficult to effectively block penetration of moisture through a surface of the plated steel sheet requiring corrosion resistance, blackening may be caused and corrosion resistance may also be deteriorated. When the content of the trivalent chromium compound exceeds 35.23 wt %, the content of the rust inhibitor to be added for improving corrosion resistance, the content of the water-soluble cationic urethane resin serving as a binder, and the content of the silane coupling agent may be relatively decreased. Therefore, there may be a problem in which it is difficult to secure sufficient corrosion resistance and blackening resistance.

The chromium phosphate (A) and chromium nitrate (B) may satisfy a content ratio A/(A+B) of 0.89 to 0.95. When the content ratio is less than 0.89, corrosion resistance may be reduced after processing. When the content ratio exceeds 0.95, blackening resistance may be reduced.

In the surface-treating solution composition, the chromium phosphate (A) and the chromium nitrate (B) may satisfy a content ratio A/(A+B) of 0.3 to 0.6. The chromium phosphate and chromium nitrate may contain a relatively large amount of water. The content ratio of the chromium phosphate (A) and the chromium nitrate (B) contained in the film layer may be within a range of 0.89 to 0.95 by way of removing water in operations of coating and drying the surface-treatment solution composition on the zinc-based plated steel sheet to form a film layer.

The content of the silane-based sol-gel resin may be preferably 32.49 wt % to 36.36 wt % based on the solids content. When the content of the silane-based sol-gel resin may be less than 32.49 wt %, corrosion resistance and black degeneration deteriorate because the corrosion factor may be not effectively blocked. When the content may be more than 36.36 wt %, the trivalent chromium compound, the content of the water-soluble cationic urethane resin serving as a binder, the silane coupling agent and the Al compound may be relatively decreased, and corrosion resistance may be rather lowered.

The content of the rust-inhibiting and corrosion-resistant agent is preferably 2.03 wt % to 2.27 wt % based on the solids content. When the content of the rust-inhibiting and corrosion-resistant agent is less than 2.03 wt %, there may be a problem in which it is difficult to secure corrosion resistance. When the content of the rust-inhibiting and corrosion-resistant agent exceeds 2.27 wt %, there may be a problem in which it is difficult to secure blackening resistance and alkali resistance. Meanwhile, the content of the molybdenum-based compound is preferably 1.14 wt % to 1.52 wt %, based on the solids content. When the content of the molybdenum-based compound is less than 1.14 wt %, there may be a problem in which it is difficult to secure blackening resistance. When the content of the molybdenum-based compound exceeds 1.52 wt %, an effect of improving blackening resistance may be insignificant, and corrosion resistance may be greatly deteriorated.

The content of the urethane resin is preferably 12.18 wt % to 13.64 wt % based on the solids content. When the content of the urethane resin is less than 12.18 wt %, the film-forming action may be deteriorated and may not form a firm film layer. Therefore, there may be a problem in which it difficult to secure alkali resistance, piping oil infiltration, and fingerprint resistance. When the content thereof exceeds 13.64 wt %, the contents of the trivalent chromium compound and the sol-gel resin may be relatively reduced, and corrosion resistance and blackening resistance properties may be reduced, which is not preferable. The surface-treatment solution composition according to the present disclosure may contain a water-soluble cationic urethane resin. The water-soluble cationic urethane resin may be detected as a urethane resin, not in a cationic state thereof, through a coating-drying process on the zinc-based plated steel sheet.

The content of the silane coupling agent is preferably 5.68 wt % to 10.15 wt %. When the content of the silane coupling agent is less than 5.68 wt %, alkali resistance and piping oil infiltration may be deteriorated. When the content of the silane coupling agent exceeds 10.15 wt %, the film may become too dry to form an excessively hard film. Therefore, processed part corrosion resistance may be reduced, and piping oil infiltration may be deteriorated.

The content of the Al compound is preferably 5.68 wt % to 10.15 wt %. When the content of the Al compound is less than 5.68 wt %, there may be a problem that it is difficult to secure blackening resistance. When the Al compound exceeds 10.15 wt %, an effect of improving blackening resistance may be insignificant, and the corrosion resistance may be greatly deteriorated.

According to an embodiment of the present disclosure, there may be provided a method for producing the zinc-based plated steel sheet, comprising: preparing a zinc-based plated steel sheet on which a zinc-based plated layer is formed; coating the surface-treatment solution composition on the zinc-based plated layer; and drying the coated surface-treatment solution composition to form a trivalent chromate film layer.

The surface-treatment solution composition may include 10 wt % to 20 wt % of a trivalent chromium compound containing chromium phosphate (A) and chromium nitrate (B) and having a content ratio A/(A+B) of 0.3 to 0.6; 20 wt % to 40 wt % of a silane-basedsol-gel; 0.2 wt % to 0.4 wt % of a rust-inhibiting and corrosion-resistant agent; 0.1 wt % to 0.3 wt % of a molybdenum-based compound; 5 wt % to 10 wt % of a water-soluble cationic urethane resin; 0.5 wt % to 2.0 wt % of a silane coupling agent; 0.5 wt % to 2.0 wt % of an Al compound; and 25.3 wt % to 63.7 wt % of water. The technical meaning of the content range of each component contained in the surface-treatment solution composition may be the same as described above.

According to an embodiment of the present disclosure, the surface-treatment solution composition is coated to a thickness of 2.14 μm to 3.57 μm. The surface-treatment solution composition coated to such a thickness may be a thickness of the dried coating layer of 0.3 μm to 0.5 μm through the drying operation. When a thickness of the surface-treatment solution composition is less than 2.14 μm, there may arise a problem in which the surface-treatment solution composition may be applied thinly on the peak portion of the roughness of the steel sheet to reduce corrosion resistance. When a thickness of the surface-treatment solution composition exceeds 3.57 μm, weldability, workability, and the like, may be deteriorated.

The method of coating the surface-treatment solution composition is not particularly limited as long as it is a commonly used coating method. For example, it is preferable to perform any one coating method selected from roll coating, spraying, immersion, spray squeezing, and immersion squeezing.

It is preferable that the drying the surface-treatment solution composition coated on the zinc-based plated steel sheet is performed at a temperature of 50° C. to 60° C. on the basis of a Peak Metal Temperature (PMT) of a steel sheet. When the drying temperature is less than 50° C. on the basis of a Peak Metal Temperature (PMT) of a steel sheet, the drying may not be performed perfectly, and alkali resistance and piping oil infiltration may be deteriorated. When the drying temperature exceeds 60° C., the steel sheet may be not sufficiently cooled during the cooling process (air cooling) in air, and blackening resistance may be deteriorated due to the condensation phenomenon by a packaging operation.

The drying operation is preferably carried out in a hot-air drying furnace or an induction heating furnace. When the surface-treating coating composition is dried using the hot-air drying furnace, the hot-air drying furnace preferably has an internal temperature of 100° C. to 200° C. Meanwhile, when the surface-treating coating composition is dried using the induction heating furnace, an electric current applied to the induction heating furnace is preferably 1,000 A to 3,500 A, and more preferably 1,500 A to 3,000 A. When an internal temperature of the hot-air drying furnace is less than 100° C. or the electric current applied to the induction heating furnace is less than 1,000 A, the surface-treating coating composition may not be completely dried, and alkali resistance and piping oil infiltration may be deteriorated. When an internal temperature of the hot-air drying furnace is less than 200° C. or the electric current applied to the induction heating furnace exceeds 3,500 A, the steel sheet may be not sufficiently cooled during the cooling process (air cooling) in air, and blackening resistance may be deteriorated due to the condensation phenomenon by a packaging operation.

In addition, a zinc-based plated steel sheet, which is finally surface-treated by drying the surface-treatment solution composition to form a trivalent chromate film layer and air-cooling the trivalent chromate film layer, may be provided.

The method for producing a surface-treated zinc-based plated steel sheet according to an embodiment of the present disclosure may be a continuous process, and a speed of the continuous process is preferably 80 mpm to 100 mpm. When a speed of the continuous process is less than 80 mpm, a problem in which productivity is reduced may occur. When a speed of the continuous process exceeds 100 mpm, a solution may be scattered in the drying operation of the solution composition for steel sheet surface treatment, and thereby surface defects may occur.

MODE FOR INVENTION

Hereinafter, the present disclosure will be described more specifically with reference to specific examples. The following examples are provided to aid understanding of the present disclosure, and the scope of the present disclosure is not limited thereto.

EXAMPLE

1. Change in Properties According to Content of Trivalent Chromium Compound

A surface-treatment solution composition containing trivalent chromium according to the present disclosure includes chromium nitrate and chromium phosphate as a trivalent chromium compound; a silane-based sol-gel resin; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; aluminum nitride as an Al compound; and water. The components were mixed in the amounts shown in Table 2 below (based on the solids content of the composition).

20 wt % of ethanol and 50.81 wt % of water were added to a flask, 1.36 wt % of formic acid was further added thereto, and the mixture was stirred. Then, 11.06 wt % of 3-glycidoxypropyl trimethoxysilane, 6.06 wt % of 3-aminopropyl triethoxysilane, and 10.7 wt % of tetraethyl orthosilicate were mixed with the stirred mixture, and the thus obtained mixture was added to the flask drop-wise for 2 hours. At this time, a reactor was cooled, such that an internal temperature of the reactor was kept below 30° C., and the drop-wisely added mixture was stirred at room temperature for 24 hours after completion of the drop-wise addition, to obtain the silane-based sol-gel resin.

TABLE 1

| Range of Composition | Solution Component (wt %) | | Solid of Raw Material (wt %) | Component in Dry Film (wt %) | |
|---|---|---|---|---|---|
| | Min. | Max. | (wt %) | Min. | Max. |
| Trivalent Chromium Compound | 10 | 20 | 31 | 35.23 | 31.47 |
| Sol-Gel Resin | 20 | 40 | 16 | 36.36 | 32.49 |
| Rust-Inhibiting and Corrosion-resistant agent | 0.2 | 0.4 | 100 | 2.27 | 2.03 |
| Molybdenum-based Compound | 0.1 | 0.3 | 100 | 1.14 | 1.52 |
| Water-Soluble Cationic Urethane Resin | 5 | 10 | 24 | 13.64 | 12.18 |
| Silane Coupling Agent | 0.5 | 2 | 100 | 5.68 | 10.15 |
| Al Compound | 0.5 | 2 | 100 | 5.68 | 10.15 |
| Water | 63.7 | 25.3 | 0 | 0 | 0 |
| Total | 100 | 100 | — | 100 | 100 |

In the following examples, cases in which the surface-treatment solution composition according to the present disclosure satisfies the specified content range shown in Table 1 below were described as Inventive Examples, cases in which one or more components do not satisfy the specified content range shown in Table 1 were described as Comparative Examples, and these cases are presented in Tables 2 to 8.

In addition, the content of each component shown in Tables 2 to 8 below was described based on "solids content." The content of each component was described, based on 100% of the solids content which remains after the removal of water contained in the trivalent chromium compound, the sol-gel resin, and the water-soluble cationic urethane resin in the form of a dry film, in addition to removal of water as a solvent contained in the solution composition of the present disclosure in the form of a dry film.

A molten zinc-based plated steel sheet was cut to have a size of 7 cm×15 cm (width×length), and oil was removed therefrom. Then, solution compositions for each of Inventive and Comparative Examples, as described in Table 2 below, were bar-coated on the steel sheet in a dry film layer thickness of 0.4 μm, and dried under conditions of PMT 60° C. to prepare specimens.

Flat sheet corrosion resistance, processed part corrosion resistance, and blackening resistance of the prepared specimens were evaluated. The evaluation results are presented in Table 2 below. The evaluation methods for flat sheet corrosion resistance, processed part corrosion resistance, and blackening resistance were as follows.

<Flat Sheet Corrosion Resistance>

Based on the method specified in ASTM B117, the rate of occurrence of white rust in the steel sheet was measured over time after the specimens were treated. The evaluation criteria are as follows:

⊚: 144 hours or more of white rust occurrence time

○: 96 hours or more and less than 144 hours of white rust occurrence time

Δ: less than 55 hours or more and less than 96 hours of white rust occurrence time X: Less than 55 hours of white rust occurrence time <Processed Part Corrosion Resistance>

The specimens were pushed up to a height of 6 mm using an Erichsen tester, and a frequency of occurrence of white rust was measured after 24 hours. The evaluation criteria are as follows:

⊚: Less than 5% frequency of occurrence of white rust after 24 hours

Δ: 5% or more and less than 7% frequency of occurrence of white rust after 24 hours X: Greater than 7% frequency of occurrence of white rust after 24 hours <Blackening Resistance>

The color change (color difference: ΔE) of the specimens before and after the test was observed by allowing the specimens in an air-conditioning equipment maintaining at 50° C. and a relative humidity of 95% for 120 hours. The evaluation criteria are as follows:

⊚: ΔE≤2

○: 2<ΔE≤3

Δ: 3<ΔE≤4

X: ΔE>4

TABLE 2

| | Composition (wt %) | | | | | | | Flat Sheet Corrosion Resistance | Processed Part Corrosion Resistance | Blackening Resistance |
|---|---|---|---|---|---|---|---|---|---|---|
| | $Cr^{3+}$ Compound | Sol-Gel Resin | Rust-Inhibiting and Corrosion-resistant agent | Molybdenum-based Compound | Urethane Resin | Silane Coupling Agent | Al Compound | | | |
| [1]CE1 | 30.52 | 36.22 | 2.16 | 1.48 | 13.53 | 9.15 | 6.94 | X | X | X |
| [2]IE1 | 31.47 | 35.27 | 2.12 | 1.42 | 13.42 | 10.05 | 6.25 | ○ | ⊚ | ○ |
| IE2 | 33.12 | 33.62 | 2.15 | 1.36 | 13.21 | 8.36 | 8.18 | ⊚ | ⊚ | ⊚ |
| IE3 | 34.15 | 32.59 | 2.13 | 1.28 | 12.52 | 7.24 | 10.09 | ⊚ | ⊚ | ⊚ |
| IE4 | 35.23 | 32.59 | 2.14 | 1.18 | 12.35 | 7.00 | 9.51 | ○ | ⊚ | ○ |
| CE2 | 36.25 | 32.59 | 2.17 | 1.16 | 12.25 | 6.43 | 9.15 | X | X | ○ |

[1]CE: Comparative Example,
[2]IE: Inventive Example
* The content of the composition may be based on 14% of the solids content.

In Table 2 above, a content ratio A/(A+B) of the chromium phosphate and the chromium nitrate in the trivalent chromium compound ($Cr^{3+}$ compound) was 3:0.2.

As shown in Table 2 above, when the content of the trivalent chromium compound satisfied the content proposed by the present disclosure (Inventive Examples 1 to 4), all of the properties exhibited good or higher results.

Meanwhile, when the trivalent chromium compound was added in a relatively small amount (Comparative Example 1), flat sheet corrosion resistance, processed part corrosion resistance, and blackening resistance exhibited poor results. When the trivalent chromium compound was added in a relatively larger amount (Comparative Example 2), all of the properties, except for blackening resistance, exhibited poor results.

2. Change in Properties According to Ratios of Chromium Phosphate (III) and Chromium Nitrate (III) Contained in Trivalent Chromium Compound Solution compositions for steel sheet surface treatment containing trivalent chromium according to Inventive Example 3 were used, except that ratios of chromium phosphate (III) and chromium nitrate (III) were controlled to the ratios of chromium phosphate and chromium nitrate as shown in Table 3.

Specifically, a chromium phosphate compound and chromium nitrate were added to distilled water, reacted at 80° C. for 1 hour, and then cooled to room temperature to prepare a trivalent chromium compound (chromium phosphate and chromium nitrate). At this time, the content of each component was controlled, such that ratios of the chromium phosphate and chromium nitrate satisfied the specified ratios shown in Table 3 below.

A molten zinc-based plated steel sheet was cut to have a size of 7 cm×15 cm (width×length), and oil was removed therefrom. Then, a solution composition for steel sheet surface treatment containing trivalent chromium, prepared in Table 3, was bar-coated on the steel sheet in a dry film layer thickness of 0.4 μm, and dried under conditions of PMT 60° C. to prepare specimens.

Flat sheet corrosion resistance and blackening resistance of the prepared specimens were evaluated. The evaluation results are presented in Table 3.

TABLE 3

| | $Cr^{3+}$ Compound (wt %) | Content Ratio of Chromium Phosphate and Chromium Nitrate | | Flat Sheet | |
|---|---|---|---|---|---|
| | | Chromium Phosphate | Chromium Nitrate | Corrosion Resistance | Blackening Resistance |
| [1]CE3 | 34.15 | 7 | 0 | ○ | X |
| CE4 | 34.15 | 0 | 0.35 | X | ○ |
| CE5 | 34.15 | 1 | 0.3 | X | ○ |
| [2]IE5 | 34.15 | 2 | 0.25 | ○ | ◎ |
| IE6 | 34.15 | 3 | 0.2 | ◎ | ◎ |
| IE7 | 34.15 | 4 | 0.2 | ◎ | ○ |
| CE6 | 34.15 | 5 | 0.1 | ○ | X |

[1]CE: Comparative Example,
[2]IE: Inventive Example
* The content of the composition may be based on 14% of the solids content.

As shown in Table 3 above, corrosion resistance may be improved as a ratio of chromium phosphate is increased, while blackening resistance may be improved as a ratio of chromium nitrate is increased. When the ratio of chromium phosphate to chromium nitrate is less than or more than the ratio of chromium phosphate and chromium nitrate shown in the present disclosure, the corrosion resistance or blackening resistance tends to be poor.

3. Change in Properties Depending on Content of Sol-Gel Resin

A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; aluminum nitride as an Al compound; and water. The components were mixed in the amounts shown in Table 2 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 4 below, was bar-coated on the steel sheet in a dry film layer thickness of 0.4 μm, and dried under conditions of PMT 60° C. to prepare specimens.

Flat sheet corrosion resistance, processed part corrosion resistance, blackening resistance, and alkali resistance of the prepared specimens were evaluated. The evaluation results are presented in Table 4 below. The evaluation methods for flat sheet corrosion resistance, processed part corrosion resistance, and blackening resistance were as follows.

TABLE 4

| | Composition (wt %) | | | | | | | | | |
|---|---|---|---|---|---|---|---|---|---|---|
| | Sol-Gel Resin | $Cr^{3+}$ Compound | Rust-Inhibiting and Corrosion-resistant agent | Molybdenum-based Compound | Urethane Resin | Silane Coupling Agent | Al Compound | Flat Sheet Corrosion Resistance | Processed Part Corrosion Resistance | Blackening Resistance |
| [1]CE7 | 31.22 | 34.82 | 2.16 | 1.48 | 13.53 | 9.85 | 6.94 | X | X | X |
| [2]IE8 | 32.49 | 34.25 | 2.12 | 1.42 | 13.42 | 10.05 | 6.25 | ○ | ◎ | ○ |
| IE9 | 33.62 | 33.12 | 2.15 | 1.36 | 13.21 | 8.36 | 8.18 | ◎ | ◎ | ◎ |

TABLE 4-continued

| | Composition (wt %) | | | | | | | | | |
|---|---|---|---|---|---|---|---|---|---|---|
| | Sol-Gel Resin | $Cr^{3+}$ Compound | Rust-Inhibiting and Corrosion-resistant agent | Molybdenum-based Compound | Urethane Resin | Silane Coupling Agent | Al Compound | Flat Sheet Corrosion Resistance | Processed Part Corrosion Resistance | Blackening Resistance |
| IE10 | 35.35 | 32.39 | 2.13 | 1.28 | 12.52 | 7.24 | 9.09 | ◉ | ◉ | ◉ |
| IE11 | 36.36 | 32.46 | 2.14 | 1.18 | 12.35 | 7.00 | 8.51 | ○ | ◉ | ○ |
| CE8 | 37.59 | 32.25 | 2.17 | 1.16 | 12.25 | 6.43 | 8.15 | X | X | ○ |

[1]CE: Comparative Example,
[2]IE: Inventive Example
* The content of the composition may be based on 14% of the solids content.

As shown in Table 4 above, when the content of the sol-gel resin satisfied the content proposed by the present disclosure (Inventive Examples 8 to 11), all of the properties exhibited good or higher results.

Meanwhile, when the sol-gel resin was added in a relatively small amount (Comparative Example 7), flat sheet corrosion resistance, processed part corrosion resistance, and blackening resistance exhibited poor results. When the sol-gel resin was added in a relatively larger amount (Comparative Example 8), all of the properties, except for blackening resistance, exhibited poor results.

4. Change in Properties Depending on Content of Rust-Inhibiting and Corrosion-Resistant Agent A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and aluminum nitride as an Al compound. The components were mixed in the amounts shown in Table 5 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 5 below, was bar-coated on the steel sheet in a dry film layer thickness of 0.4 μm, and dried under conditions of PMT 60° C. to prepare specimens.

Flat sheet corrosion resistance, processed part corrosion resistance, blackening resistance, and alkali resistance of the prepared specimens were evaluated. The evaluation results are presented in Table 5 below. The evaluation methods for flat sheet corrosion resistance, processed part corrosion resistance, and blackening resistance were as described above, and the evaluation method for alkali resistance was as follows:

<Alkali Resistance>

The specimens were immersed in an alkaline degreasing solution at 60° C. for 2 minutes, washed with water, air dried, and then measured with regard to a difference in color (ΔE) before and after the operations. The alkali degreasing solution was Finecleaner L 4460 A: 20 g/2.4 L+L 4460 B 12 g/2.4 L (pH=12) manufactured by Parkerizing Co., Ltd. The evaluation criteria are as follows:

◉: ΔE≤2
○: 2<ΔE≤3
Δ: 3<ΔE≤4
X: ΔE>4

TABLE 5

| | Composition (wt %) | | | | | | | | | | |
|---|---|---|---|---|---|---|---|---|---|---|---|
| | Rust-Inhibiting and Corrosion-resistant agent | $Cr^{3+}$ Compound | Sol-Gel Resin | Molybdenum-based Compound | Urethane Resin | Silane Coupling Agent | Al Compound | Flat Sheet Corrosion Resistance | Processed Part Corrosion Resistance | Blackening Resistance | Alkali Resistance |
| [1]CE9 | 1.86 | 33.12 | 33.22 | 1.48 | 13.53 | 9.85 | 6.94 | X | X | ◉ | ◉ |
| [2]IE12 | 2.03 | 33.34 | 33.49 | 1.42 | 13.42 | 10.05 | 6.25 | ○ | ◉ | ◉ | ◉ |
| IE13 | 2.15 | 33.12 | 33.62 | 1.36 | 13.21 | 8.36 | 8.18 | ○ | ◉ | ◉ | ◉ |
| IE14 | 2.27 | 32.25 | 35.35 | 1.28 | 12.52 | 7.24 | 9.09 | ◉ | ◉ | ○ | ○ |
| CE10 | 3.14 | 32.46 | 35.36 | 1.18 | 12.35 | 7.00 | 8.51 | ◉ | ◉ | ○ | X |
| CE11 | 5.17 | 32.25 | 34.59 | 1.16 | 12.25 | 6.43 | 8.15 | ◉ | ◉ | X | X |

[1]CE: Comparative Example,
[2]IE: Inventive Example
* The content of the composition may be based on 14% of the solids content.

As shown in Table 5 above, when the content of the rust-inhibiting and corrosion-resistant agent satisfied the content proposed by the present disclosure (Inventive Examples 12 to 14), all of the properties exhibited good or higher results.

Meanwhile, when the rust-inhibiting and corrosion-resistant agent was added in a relatively small amount (Comparative Example 9), all the properties, except for blackening resistance and alkali resistance, exhibited poor results. When the rust-inhibiting and corrosion-resistant agent was added in a relatively large amount (Comparative Examples 10 and 11), all the properties, except for corrosion resistance, exhibited poor results.

5. Change in Properties Depending on Content of Molybdenum-Based Compound

A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and aluminum nitride as an Al compound. The components were mixed in the amounts shown in Table 6 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 6 below, was bar-coated on the steel sheet in a dry film layer thickness of 0.4 μm, and dried under conditions of PMT 60° C. to prepare specimens.

Flat sheet corrosion resistance, processed part corrosion resistance, and blackening resistance of the prepared specimens were evaluated. The evaluation results are presented in Table 6 below. The evaluation methods for flat sheet corrosion resistance, processed part corrosion resistance, and blackening resistance were as described above.

and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and aluminum nitride as an Al compound. The components were mixed in the amounts shown in Table 7 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 7 below, was bar-coated on the steel sheet in a dry film layer thickness of 0.4 μm, and dried under conditions of PMT 60° C. to prepare specimens.

Flat sheet corrosion resistance, processed part corrosion resistance, blackening resistance, alkali resistance, piping oil infiltration, and fingerprint resistance of the prepared specimens were evaluated. The evaluation results are presented in Table 7 below. The evaluation methods of flat sheet corrosion resistance, processed part corrosion resistance, blackening resistance, and alkali resistance areas described above, and the evaluation methods of piping oil infiltration and fingerprint resistance are as follows.

TABLE 6

| | Composition (wt %) | | | | | | | | | |
|---|---|---|---|---|---|---|---|---|---|---|
| | Molybdenum-based Compound | $Cr^{3+}$ Compound | Sol-Gel Resin | Rust-Inhibiting and Corrosion-resistant agent | Urethane Resin | Silane Coupling Agent | Al Compound | Flat Sheet Corrosion Resistance | Processed Part Corrosion Resistance | Blackening Resistance |
| [1]CE12 | 0.78 | 33.52 | 33.22 | 2.16 | 13.53 | 9.85 | 6.94 | ⊚ | ○ | X |
| [2]IE15 | 1.14 | 33.53 | 33.49 | 2.12 | 13.42 | 10.05 | 6.25 | ⊚ | ○ | ○ |
| IE16 | 1.36 | 33.12 | 33.62 | 2.15 | 13.21 | 8.36 | 8.18 | ⊚ | ○ | ○ |
| IE17 | 1.52 | 32.15 | 35.35 | 2.13 | 12.52 | 7.24 | 9.09 | ○ | ○ | ⊚ |
| CE13 | 2.18 | 32.46 | 35.36 | 2.14 | 12.35 | 7.00 | 8.51 | X | X | ⊚ |
| CE14 | 2.86 | 33.55 | 34.59 | 2.17 | 12.25 | 6.43 | 8.15 | X | X | ⊚ |

[1]CE: Comparative Example,
[2]IE: Inventive Example
* The content of the composition may be based on 14% of the solids content.

As shown in Table 6 above, when the content of the molybdenum-based compound satisfied the content proposed by the present disclosure (Inventive Examples 15 to 17), all of the properties exhibited good or higher results.

Meanwhile, when the molybdenum-based compound was added in a relatively small amount (Comparative Example 12), blackening resistance exhibited poor results. When the molybdenum-based compound was added in a relatively large amount (Comparative Examples 13 and 14), corrosion resistance exhibited poor results. These results confirmed that, when the content of the molybdenum-based compound exceeded the content proposed by the present disclosure, it precipitated from the surface of the steel sheet during the film formation, and the molybdenum-based compound dissolved in the brine solution caused defects in the coating layer.

6. Change in Properties Depending on Content of Urethane Resin

A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting <Piping Oil Infiltration>

The piping oil infiltration indicates the extent to which piping oil used in the pipe manufacturing facility passes through dried film layer to deteriorate surface properties of the film layer. In order to evaluate the piping oil infiltration, the specimens were immersed in piping oil at room temperature, maintained for 24 hours, and then the color difference (ΔE) before and after the immersion operation was measured. The piping oil was prepared by diluting BW WELL MP-411, Buhmwoo Chemical Ind. Co. Ltd., in 10% water. The evaluation criteria are as follows:

⊚: ΔE≤2
○: 2<ΔE≤3
Δ: 3<ΔE≤4
X: ΔE>4

<Fingerprint Resistance>

Surfaces of the specimens were coated with vaseline, maintained for 10 minutes, and the vaseline was removed therefrom. The color difference (ΔE) before and after coating with vaseline was observed. The evaluation criteria are as follows:

⊚: ΔE≤2
○: 2<ΔE≤3
Δ: 3<ΔE≤4
X: ΔE>4

TABLE 7

| | Composition (wt %) | | | | | | |
|---|---|---|---|---|---|---|---|
| | Urethane Resin | $Cr^{3+}$ Compound | Sol-Gel Resin | Rust-Inhibiting and Corrosion-resistant agent | Molybdenum-based Compound | Silane Coupling Agent | Al Compound |
| [1]CE15 | 11.83 | 33.52 | 34.22 | 2.16 | 1.48 | 9.85 | 6.94 |
| [2]IE18 | 12.18 | 33.53 | 34.45 | 2.12 | 1.42 | 10.05 | 6.25 |
| IE19 | 12.85 | 33.12 | 33.98 | 2.15 | 1.36 | 8.36 | 8.18 |
| IE20 | 13.21 | 32.15 | 33.90 | 2.13 | 1.28 | 7.24 | 10.09 |
| IE21 | 13.64 | 32.46 | 34.07 | 2.14 | 1.18 | 7.00 | 9.51 |
| CE16 | 14.25 | 33.55 | 33.29 | 2.17 | 1.16 | 6.43 | 9.15 |

| | Alkali Resistance | Piping oil Infiltration | Fingerprint Resistance | Flat Sheet Corrosion Resistance | Processed Part Corrosion Resistance | Blackening Resistance |
|---|---|---|---|---|---|---|
| [1]CE15 | X | X | X | ○ | X | ○ |
| [2]IE18 | ○ | ○ | ○ | ◎ | ◎ | ○ |
| IE19 | ○ | ◎ | ○ | ◎ | ◎ | ◎ |
| IE20 | ◎ | ◎ | ◎ | ○ | ◎ | ◎ |
| IE21 | ◎ | ◎ | ◎ | ○ | ◎ | ○ |
| CE16 | ◎ | ◎ | ◎ | X | X | X |

[1]CE: Comparative Example,
[2]IE: Inventive Example
* The content of the composition may be based on 14% of the solids content.

As shown in Table 7 above, when the content of the urethane resin satisfied the content proposed by the present disclosure (Inventive Examples 18 to 21), all of the properties exhibited good or higher results.

Meanwhile, when the urethane resin was added in a relatively small amount (Comparative Example 13), all of the properties, except for flat sheet corrosion resistance and blackening resistance, exhibited poor results. When the urethane resin was added in a relatively large amount (Comparative Example 16), processed part corrosion resistance, flat sheet corrosion resistance, and blackening resistance exhibited poor results.

7. Change in Properties Depending on Content and Type of Silane Coupling Agent

A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and aluminum nitride as an Al compound. The components were mixed in the amounts shown in Table 8 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 8 below, was bar-coated on the steel sheet in a dry film layer thickness of 0.4 μm, and dried under conditions of PMT 60° C. to prepare specimens.

Flat sheet corrosion resistance, processed part corrosion resistance, blackening resistance, alkali resistance, piping oil infiltration, and fingerprint resistance of the prepared specimens were evaluated. The evaluation results are presented in Table 8 below. The evaluation methods of flat sheet corrosion resistance, processed part corrosion resistance, blackening resistance, and alkali resistance are as described above.

TABLE 8

| | Composition (wt %) | | | | | | |
|---|---|---|---|---|---|---|---|
| | Silane Coupling Agent | $Cr^{3+}$ Compound | Sol-Gel Resin | Rust-Inhibiting and Corrosion-resistant agent | Molybdenum-based Compound | Urethane Resin | Al Compound |
| [1]CE17 | 2.85 | 34.52 | 35.52 | 2.16 | 1.48 | 13.53 | 9.94 |
| [2]IE22 | 5.68 | 33.53 | 34.58 | 2.12 | 1.42 | 13.42 | 9.25 |
| IE23 | 7.36 | 33.12 | 34.62 | 2.15 | 1.36 | 13.21 | 8.18 |
| IE24 | 8.84 | 32.15 | 33.90 | 2.13 | 1.28 | 12.52 | 9.18 |

TABLE 8-continued

| | | | | | | | |
|---|---|---|---|---|---|---|---|
| IE25 | 10.15 | 32.46 | 34.07 | 2.14 | 1.18 | 12.35 | 7.65 |
| CE18 | 14.53 | 31.55 | 32.59 | 2.17 | 1.16 | 12.25 | 5.75 |

| | Alkali Resistance | Piping oil Infiltration | Fingerprint Resistance | Flat Sheet Corrosion Resistance | Processed Part Corrosion Resistance | Blackening Resistance |
|---|---|---|---|---|---|---|
| [1]CE17 | X | X | ○ | ○ | ⊚ | ○ |
| [2]IE22 | ○ | ○ | ○ | ⊚ | ⊚ | ○ |
| IE23 | ○ | ⊚ | ○ | ⊚ | ⊚ | ⊚ |
| IE24 | ⊚ | ⊚ | ⊚ | ⊚ | ⊚ | ⊚ |
| IE25 | ⊚ | ○ | ⊚ | ⊚ | ⊚ | ○ |
| CE18 | ○ | ○ | ○ | ⊚ | X | X |

[1]CE: Comparative Example,
[2]IE: Inventive Example
* The content of the composition may be based on 14% of the solids content.

As shown in Table 8 above, when the content of the silane coupling agent satisfied the content proposed by the present disclosure (Inventive Examples 22 to 25), all of the properties exhibited good or higher results.

Meanwhile, when the silane coupling agent was added in a relatively small amount (Comparative Example 17), alkali resistance and oil resistance exhibited poor results. When the silane coupling agent was added in a relatively large amount (Comparative Example 18), the film may become too dry to form a hard film. Therefore, processed part corrosion resistance was reduced, and blackening resistance exhibited poor results.

The surface-treatment solution composition containing trivalent chromium according to Inventive Example 23 was used, but a silane coupling agent was used as the silane coupling agent shown in Table 9 below. As described above, specimens were prepared with the compositions using the silane coupling agents described in Table 9 below, and flat sheet corrosion resistance was evaluated. The results are shown in Table 9 below.

TABLE 9

| [1]IE No. | Content | | | | | | | | | | | Flat Sheet Corrosion Resistance |
|---|---|---|---|---|---|---|---|---|---|---|---|---|
| | A | B | C | D | E | F | G | H | I | J | K | |
| 26 | 7.36 | 0 | 0 | 0 | 0 | 0 | 0 | 0 | 0 | 0 | 0 | ○ |
| 27 | 0 | 7.36 | 0 | 0 | 0 | 0 | 0 | 0 | 0 | 0 | 0 | ⊚ |
| 28 | 0 | 0 | 7.36 | 0 | 0 | 0 | 0 | 0 | 0 | 0 | 0 | ○ |
| 29 | 0 | 0 | 0 | 7.36 | 0 | 0 | 0 | 0 | 0 | 0 | 0 | ⊚ |
| 30 | 0 | 0 | 0 | 0 | 7.36 | 0 | 0 | 0 | 0 | 0 | 0 | ○ |
| 31 | 0 | 0 | 0 | 0 | 0 | 7.36 | 0 | 0 | 0 | 0 | 0 | ⊚ |
| 32 | 0 | 0 | 0 | 0 | 0 | 0 | 7.36 | 0 | 0 | 0 | 0 | ○ |
| 33 | 0 | 0 | 0 | 0 | 0 | 0 | 0 | 7.36 | 0 | 0 | 0 | ○ |
| 34 | 0 | 0 | 0 | 0 | 0 | 0 | 0 | 0 | 7.36 | 0 | 0 | ○ |
| 35 | 0 | 0 | 0 | 0 | 0 | 0 | 0 | 0 | 0 | 7.36 | 0 | ⊚ |
| 36 | 0 | 0 | 0 | 0 | 0 | 0 | 0 | 0 | 0 | 0 | 7.36 | ○ |
| 37 | 3.68 | 3.68 | 0 | 0 | 0 | 0 | 0 | 0 | 0 | 0 | 0 | ○ |
| 38 | 3.68 | 0 | 0 | 3.68 | 0 | 0 | 0 | 0 | 0 | 0 | 0 | ○ |
| 39 | 0 | 3.68 | 0 | 0 | 0 | 3.68 | 0 | 0 | 0 | 0 | 0 | ⊚ |
| 40 | 0 | 0 | 0 | 3.68 | 0 | 3.68 | 0 | 0 | 0 | 0 | 0 | ○ |
| 41 | 0 | 0 | 0 | 0 | 3.68 | 0 | 3.68 | 0 | 0 | 0 | 0 | ○ |
| 42 | 0 | 0 | 0 | 0 | 0 | 3.68 | 0 | 0 | 0 | 3.68 | 0 | ⊚ |
| 43 | 0 | 0 | 3.68 | 0 | 0 | 3.68 | 0 | 0 | 0 | 0 | 0 | ○ |
| 44 | 0 | 0 | 0 | 0 | 0 | 0 | 3.68 | 0 | 0 | 3.68 | 0 | ○ |
| 45 | 3.68 | 0 | 0 | 0 | 0 | 0 | 0 | 0 | 0 | 3.68 | 0 | ○ |
| 46 | 0 | 0 | 0 | 0 | 0 | 0 | 0 | 0 | 0 | 3.68 | 3.68 | ○ |
| 47 | 0 | 0 | 0 | 3.68 | 0 | 0 | 0 | 0 | 3.68 | 0 | 0 | ○ |
| 48 | 0 | 0 | 0 | 0 | 3.68 | 0 | 0 | 3.68 | 0 | 0 | 0 | ○ |
| 49 | 0 | 0 | 0 | 0 | 0 | 0 | 0 | 3.68 | 0 | 0 | 3.68 | ○ |
| 50 | 0 | 3.68 | 3.68 | 0 | 0 | 0 | 0 | 0 | 0 | 0 | 0 | ⊚ |
| 51 | 0 | 0 | 3.68 | 0 | 0 | 0 | 0 | 0 | 0 | 0 | 3.68 | ○ |
| 52 | 0 | 0 | 0 | 0 | 0 | 0 | 3.68 | 0 | 3.68 | 0 | 0 | ○ |
| 53 | 0 | 0 | 0 | 0 | 3.68 | 0 | 0 | 0 | 3.68 | 0 | 0 | ○ |
| 54 | 0 | 3.68 | 0 | 3.68 | 0 | 0 | 0 | 0 | 0 | 0 | 0 | ⊚ |
| 55 | 0 | 3.68 | 0 | 0 | 0 | 0 | 0 | 0 | 0 | 0 | 3.68 | ○ |
| 56 | 3.68 | 0 | 3.68 | 0 | 0 | 0 | 0 | 0 | 0 | 0 | 0 | ○ |

TABLE 9-continued

| ¹IE No. | Content | | | | | | | | | | | Flat Sheet Corrosion Resistance |
|---|---|---|---|---|---|---|---|---|---|---|---|---|
| | A | B | C | D | E | F | G | H | I | J | K | |
| 57 | 0 | 0 | 0 | 0 | 0 | 0 | 0 | 0 | 3.68 | 3.68 | 0 | ○ |
| 58 | 0 | 3.68 | 0 | 0 | 3.68 | 0 | 0 | 0 | 0 | 0 | 0 | ○ |
| 59 | 0 | 0 | 0 | 0 | 0 | 0 | 3.68 | 3.68 | 0 | 0 | 0 | ○ |

A: 2-(3,4-epoxycyclohexyl)-ethyl trimethoxysilane
B: 3-glycidoxypropyl trimethoxysilane
C: 3-glycidoxypropyl methyldiethoxysilane
D: 3-glycidoxypropyl triethoxysilane
E: N-2-(aminoethyl)-3-aminopropyl methyldimethoxysilane
F: N-2-(aminoethyl)-3-aminopropyl trimethoxysilane
G: N-2-(aminoethyl)-3-aminopropyl triethoxysilane
H: 3-aminopropyl trimethoxysilane
I: 3-aminopropyl triethoxysilane
J: 3-ureidopropyl trimethoxysilane
K: 3-ureidopropyl trialkoxysilane
¹IE: Inventive Example
* The content of the composition may be based on 14% of the solids content.

As shown in Table 8 above, Inventive Examples 26 to 59 exhibited good or excellent flat sheet corrosion resistance. In particular, in the case of the test specimen treated with the solution composition for steel sheet surface treatment containing trivalent chromium prepared according to the composition of Inventive Example 42, an area of white rust generated after 144 hours or more was 0%, which exhibited the most excellent.

8. Change in Properties According to Content of Al Compound

A surface-treatment solution composition containing trivalent chromium according to the present disclosure includes chromium nitrate and chromium phosphate as a trivalent chromium compound; a sol-gel resin prepared by the method mentioned in the description of the present disclosure; a cobalt-based rust inhibitor as a rust-inhibiting and corrosion-resistant agent; molybdenum chloride as a molybdenum-based compound; a water-soluble cationic urethane resin (a urethane resin having a cation, which may be used in an acidic state); N-2-(aminoethyl)-3-aminopropyl methyldimethoxysilane and 3-ureidopropyl trimethoxysilane (1:1 mixture) as a silane coupling agent; and aluminum nitride as an Al compound. The components were mixed in the amounts shown in Table 10 below (based on the solids content of the composition).

A molten zinc-based plated steel sheet was cut to have a size of 7 cm×15 cm (width×length), and oil was removed therefrom. Then, a trivalent chromium surface-treating solution composition, prepared in Table 10 below, was bar-coated on the steel sheet in a dry film layer thickness of 0.4 μm, and dried under conditions of PMT 60° C. to prepare specimens.

Flat sheet corrosion resistance, processed part corrosion resistance, blackening resistance, alkali resistance, piping oil infiltration, and fingerprint resistance of the prepared specimens were evaluated. The evaluation results are presented in Table 10 below. The evaluation methods of flat sheet corrosion resistance, processed part corrosion resistance, blackening resistance, and alkali resistance are as described above.

TABLE 10

| | Composition (wt %) | | | | | | | | | |
|---|---|---|---|---|---|---|---|---|---|---|
| | Al Compound | Cr³⁺ Compound | Sol-Gel Resin | Rust-Inhibiting and Corrosion-resistant agent | Molybdenum-based Compound | Urethane Resin | Silane Coupling Agent | Flat Sheet Corrosion Resistance | Processed Part Corrosion Resistance | Blackening Resistance |
| ¹CE19 | 2.85 | 34.52 | 35.52 | 2.16 | 1.48 | 13.53 | 9.94 | ◎ | ○ | X |
| ²IE60 | 5.68 | 33.53 | 34.58 | 2.12 | 1.42 | 13.42 | 9.25 | ◎ | ○ | ○ |
| IE61 | 7.36 | 33.12 | 34.62 | 2.15 | 1.36 | 13.21 | 8.18 | ◎ | ○ | ○ |
| IE62 | 8.84 | 32.15 | 33.90 | 2.13 | 1.28 | 12.52 | 9.18 | ○ | ○ | ◎ |
| IE63 | 10.15 | 32.46 | 34.07 | 2.14 | 1.18 | 12.35 | 7.65 | ○ | ○ | ◎ |
| CE20 | 14.53 | 31.55 | 32.59 | 2.17 | 1.16 | 12.25 | 5.75 | X | X | ◎ |

¹CE: Comparative Example,
²IE: Inventive Example
* The content of the composition may be based on 14% of the solids content.

As shown in Table 10 above, when the content of the Al compound satisfied the content proposed by the present disclosure (Inventive Examples 60 to 63), all of the properties exhibited good or higher results.

Meanwhile, when the Al compound was added in a relatively small amount (Comparative Example 19), blackening resistance exhibited poor results. When the Al compound was added in a relatively large amount (Comparative Example 20), corrosion resistance exhibited poor results.

These results confirmed that, when the content of the Al compound exceeded the content proposed by the present disclosure, it precipitated from the surface of the steel sheet during the film formation, and the Al compound dissolved in water caused defects in the coating layer.

9. Change in Properties According to Thickness of Film Layer and Drying Temperature A molten zinc-based plated steel sheet was cut to have a size of 7 cm×15 cm (width×length), and oil was removed therefrom. Then, the composition of Inventive Example 42 was bar-coated, and dried with a hot-air drying furnace to prepare specimens. Thicknesses of the coated film layers and PMT temperatures were controlled to the thicknesses shown in Table 11 below.

Alkali resistance, piping oil infiltration, fingerprint resistance, flat sheet corrosion resistance, processed part corrosion resistance, and blackening resistance of the prepared specimens were evaluated. The evaluation results are presented in Table 11 below.

TABLE 11

| | Thickness Of Film Layer (μm) | Dry Temp. (° C.) | Alkali Resistance | Piping oil Infiltration | Fingerprint Resistance | Flat Sheet Corrosion Resistance | Processed Part Corrosion Resistance | Blackening Resistance |
|---|---|---|---|---|---|---|---|---|
| *IE64 | 0.1 | 50 | Δ | Δ | ○ | Δ | Δ | Δ |
| IE65 | 0.3 | 50 | ⊚ | ⊚ | ⊚ | ⊚ | ⊚ | ⊚ |
| IE66 | 0.4 | 50 | ⊚ | ⊚ | ⊚ | ⊚ | ⊚ | ⊚ |
| IE67 | 0.5 | 50 | ⊚ | ⊚ | ⊚ | ⊚ | ⊚ | ○ |
| IE68 | 0.8 | 50 | ⊚ | ⊚ | ⊚ | ⊚ | ⊚ | ○ |
| IE69 | 0.4 | 40 | Δ | Δ | ⊚ | ○ | ○ | ○ |
| IE70 | 0.4 | 60 | ⊚ | ⊚ | ⊚ | ⊚ | ⊚ | ⊚ |
| IE71 | 0.4 | 70 | ⊚ | ⊚ | ⊚ | ⊚ | ⊚ | Δ |

*IE: Inventive Example

As shown in Table 11 above, when the film layer was formed at 0.3 μm to 0.5 μm (Inventive Examples 65 to 67, and 70), all of the properties exhibited good or higher results.

Meanwhile, when the formed film was relatively thin (Inventive Example 64), all of the properties, except for fingerprint resistance, exhibited moderate results (Δ). Meanwhile, when the film was formed relatively thick (Inventive Example 68), all of the properties exhibited good or higher results. In this regard, a thicker film than those of Example 67 is not required in view of economy, since the film has no improved properties as compared with Inventive Example 67.

Further, as shown in Table 11 above, when the film layer was formed at a drying temperature of the film of 50° C. to 60° C. (Inventive Examples 65 to 68, and 70), all of the properties exhibited good or higher results.

When the drying temperature was relatively low (Inventive Example 69), sufficient drying was not carried out, and alkali resistance and piping oil infiltration exhibited moderate results (Δ). Meanwhile, when the drying temperature was relatively high (Inventive Example 71), the steel sheet was not sufficiently cooled during the cooling process (air cooling) in air, and, consequently, blackening resistance exhibited moderate results (Δ) due to the condensation phenomenon by a packaging operation.

While example embodiments have been shown and described above, it will be apparent to those skilled in the art that modifications and variations could be made without departing from the scope of the present disclosure as defined by the appended claims.

The invention claimed is:

1. A surface-treatment solution composition for a zinc-based plated steel sheet, comprising:
    10 wt % to 20 wt % of a trivalent chromium compound containing chromium phosphate (A) and chromium nitrate (B);
    20 wt % to 40 wt % of a silane-based sol-gel resin in which three types of silane compounds are crosslinked;
    0.2 wt % to 0.4 wt % of a rust-inhibiting and corrosion-resistant agent;
    0.1 wt % to 0.3 wt % of a molybdenum-based compound;
    5 wt % to 10 wt % of a water-soluble cationic urethane resin;
    0.5 wt % to 2.0 wt % of a silane coupling agent;
    0.5 wt % to 2.0 wt % of an Al compound; and
    25.3 wt % to 63.7 wt % of water.

2. The surface-treatment solution composition according to claim 1, wherein the chromium phosphate (A) and the chromium nitrate (B) satisfy a content ratio A/(A+B) of 0.3 to 0.6.

3. The surface-treatment solution composition according to claim 1, wherein the rust-inhibiting and corrosion-resistant agent is one or more selected from the group consisting of a fluorine-based rust inhibitor (excluding molybdenum fluoride), a vanadium-based rust inhibitor (excluding a fluorine compound), a cerium salt-based rust inhibitor (excluding a fluorine compound), and a cobalt-based rust inhibitor (excluding a fluorine compound).

4. The surface-treatment solution composition according to claim 1, wherein the molybdenum-based compound is one or more selected from the group consisting of molybdenum oxide, molybdenum sulfide, molybdenum acetate, molybdenum phosphate, molybdenum carbide, molybdenum chloride, molybdenum fluoride, and molybdenum nitride.

5. The surface-treatment solution composition according to claim 1, wherein the silane coupling agent is one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(amino ethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

6. The surface-treatment solution composition according to claim 1, wherein the three types of silane compounds comprise:
    one type of first silane selected from the group consisting of tetraethylorthosilicate, tetramethoxysilane, methyltrimethoxysilane, methyltriethoxysilane, dimethyldimethoxysilane, and dimethyldiethoxysilane;
    one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

7. A surface-treated zinc-based plated steel sheet comprising:
a steel sheet;
a zinc-based plated layer formed on at least one surface of the steel sheet; and
a trivalent chromate film layer formed on the zinc-based plated layer,
wherein the trivalent chromate film layer comprises:
31.47 wt % to 35.23 wt % of a trivalent chromium compound containing chromium phosphate (A) and chromium nitrate (B);
32.49 wt % to 36.36 wt % of a silane-based sol-gel resin in which three types of silane compounds are crosslinked;
2.03 wt % to 2.27 wt % of a rust-inhibiting and corrosion-resistant agent;
1.14 wt % to 1.52 wt % of a molybdenum-based compound;
12.18 wt % to 13.64 wt % of a urethane resin;
5.68 wt % to 10.15 wt % of a silane coupling agent; and
5.68 wt % to 10.15 wt % of an Al compound.

8. The surface-treated zinc-based plated steel sheet according to claim 7, wherein the chromium phosphate (A) and chromium nitrate (B) satisfy a content ratio A/(A+B) of 0.89 to 0.95.

9. The surface-treated zinc-based plated steel sheet according to claim 7, wherein the rust-inhibiting and corrosion-resistant agent is one or more selected from the group consisting of a fluorine-based rust inhibitor (excluding molybdenum fluoride), a vanadium-based rust inhibitor (excluding a fluorine compound), a cerium salt-based rust inhibitor (excluding a fluorine compound), and a cobalt-based rust inhibitor (excluding a fluorine compound).

10. The surface-treated zinc-based plated steel sheet according to claim 7, wherein the molybdenum-based compound is one or more selected from the group consisting of molybdenum oxide, molybdenum sulfide, molybdenum acetate, molybdenum phosphate, molybdenum carbide, molybdenum chloride, molybdenum fluoride, and molybdenum nitride.

11. The surface-treated zinc-based plated steel sheet according to claim 7, wherein the silane coupling agent is one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

12. The surface-treated zinc-based plated steel sheet according to claim 7, wherein the trivalent chromate film layer has a thickness of 0.3 μm to 0.5 μm.

13. The surface-treated zinc-based plated steel sheet according to claim 7, wherein the three types of silane compounds comprise:
one type of first silane selected from the group consisting of tetraethylorthosilicate, tetramethoxysilane, methyltrimethoxysilane, methyltriethoxysilane, dimethyldimethoxysilane, and dimethyldiethoxysilane;
one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and
one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

14. A method for producing a surface-treated zinc-based plated steel sheet, comprising:
coating a surface-treatment solution composition on a zinc-based plated steel sheet on which a zinc-based plated layer is formed; and
drying the coated surface-treatment solution composition to form a trivalent chromate film layer,
wherein the surface-treatment solution composition comprises:
10 wt % to 20 wt % of a trivalent chromium compound containing chromium phosphate (A) and chromium nitrate (B);
20 wt % to 40 wt % of a silane-based sol-gel resin in which three types of silane compounds are crosslinked;
0.2 wt % to 0.4 wt % of a rust-inhibiting and corrosion-resistant agent;
0.1 wt % to 0.3 wt % of a molybdenum-based compound;
5 wt % to 10 wt % of a water-soluble cationic urethane resin;
0.5 wt % to 2.0 wt % of a silane coupling agent;
0.5 wt % to 2.0 wt % of an Al compound; and
25.3 wt % to 63.7 wt % of water.

15. The method according to claim 14, wherein the chromium phosphate (A) and the chromium nitrate (B) satisfy a content ratio A/(A+B) of 0.3 to 0.6.

16. The method according to claim 14, wherein the rust-inhibiting and corrosion-resistant agent is one or more selected from the group consisting of a fluorine-based rust inhibitor (excluding molybdenum fluoride), a vanadium-based rust inhibitor (excluding a fluorine compound), a cerium salt-based rust inhibitor (excluding a fluorine compound), and a cobalt-based rust inhibitor (excluding a fluorine compound).

17. The method according to claim 14, wherein the molybdenum-based compound is one or more selected from the group consisting of molybdenum oxide, molybdenum sulfide, molybdenum acetate, molybdenum phosphate, molybdenum carbide, molybdenum chloride, molybdenum fluoride, and molybdenum nitride.

18. The method according to claim 14, wherein the silane coupling agent is one or more selected from the group consisting of 2-(3,4-epoxycyclohexyl)-ethyl trimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureidopropyl trimethoxysilane, and 3-ureidopropyl trialkoxysilane.

19. The method according to claim 14, wherein the three types of silane compounds comprise:
one type of first silane selected from the group consisting of tetraethylorthosilicate, tetramethoxysilane, methyltrimethoxysilane, methyltriethoxysilane, dimethyldimethoxysilane, and dimethyldiethoxysilane;

one type of second silane selected from the group consisting of 3-glycidoxypropyl trimethoxysilane, 2-(3,4-epoxycyclohexyl)-ethyl trimethoxysilane, 3-glycidoxypropyl trimethoxysilane, and 3-glycidoxypropyl methyldiethoxysilane; and one type of third silane selected from the group consisting of 3-aminopropyl triethoxysilane, N-2-(aminoethyl)-3-aminopropyl methyldimethoxysilane, N-2-(aminoethyl)-3-aminopropyl trimethoxysilane, and N-2-(aminoethyl)-3-aminopropyl triethoxysilane.

20. The method according to claim 14, wherein the surface-treatment solution composition is coated to a thickness of 2.14 μm to 3.57 μm.

\* \* \* \* \*